United States Patent Office 3,104,558
Patented Sept. 24, 1963

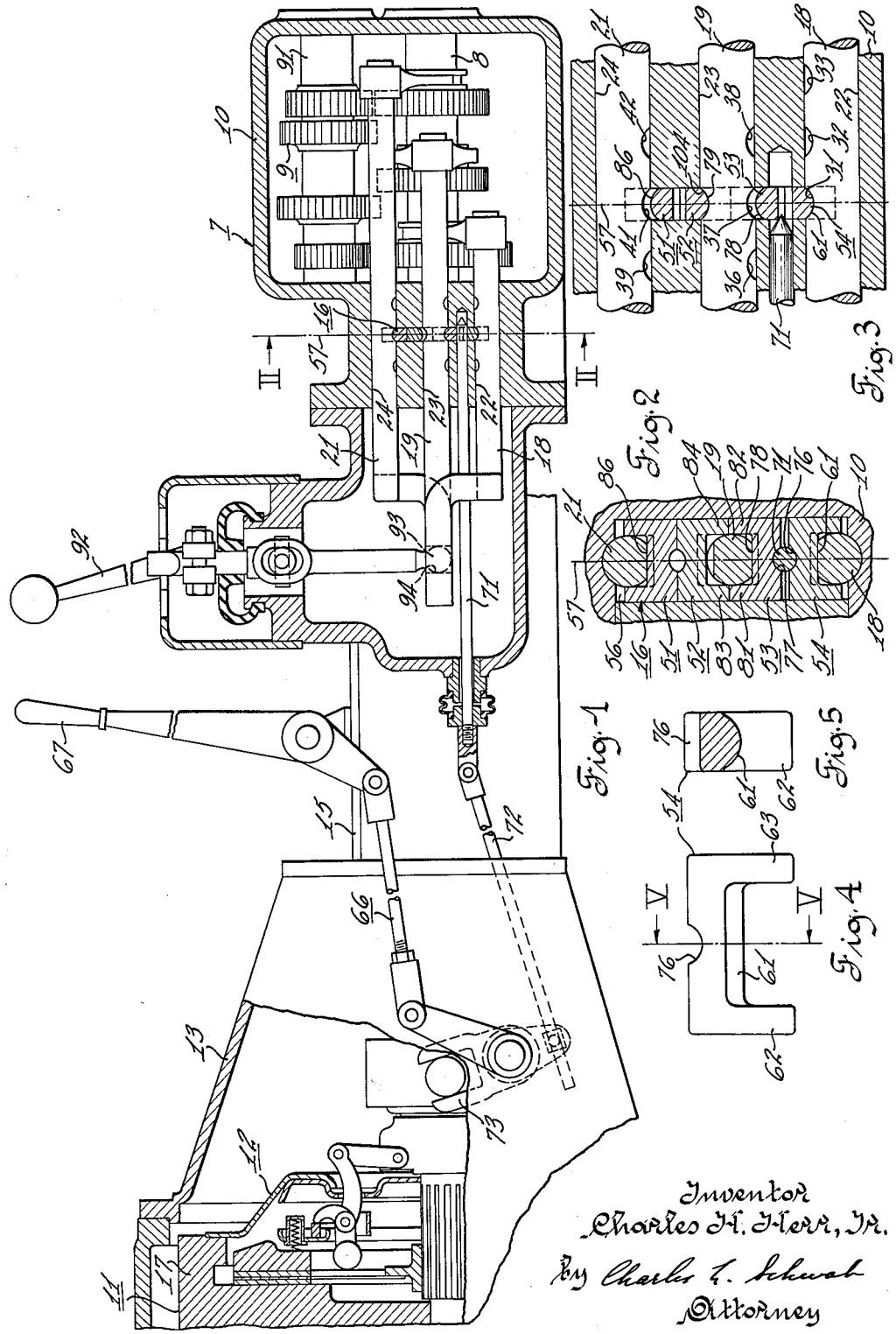

3,104,558
POSITIVE LOCK AND INTERLOCK FOR
SHIFT RODS
Charles H. Herr, Jr., Springfield, Ill., assignor to Allis-
Chalmers Manufacturing Company, Milwaukee, Wis.
Filed Nov. 13, 1961, Ser. No. 151,764
4 Claims. (Cl. 74—477)

This invention relates to a positive lock and interlock for shift rods of change speed transmissions.

Heretofore, in change speed transmissions, wherein gears are shiftable by movement of reciprocable shift rods, positive locking mechanisms for the shift rods have been employed in order to prevent accidental shifting when the transmission input shaft is in driven engagement with the engine and also interlock mechanisms to retain the rods not being shifted in their neutral position when one of the rods is shifted between its neutral and shifted positions and the input shaft is disengaged from the engine. In some such structures the positive locking mechanism is located and controlled inedependently of the interlock and such an arrangement requires a multiplicity of parts and therefore is costly to produce and service. In other conventional mechanisms combining the feature of positively locking the shift rods during engagement of the engine with the input shaft of the transmission and the feature of interlock between the shift rods during disengagement of the input shaft and gear shifting, the contact area between the locking elements and the rods has been insufficient thereby resulting in excessive wear and failure to properly function.

Generally, it is an object of the present invention to provide an improved gear shifting device which automatically prevents shifting of the shift rods during engagement of a clutch means and which retains the shift rods in their respective positions during disengagement of the clutch means and movement of one of the shift rods between its neutral and shifted positions.

Another object of the present invention is to provide an improved shift rod control mechanism which performs the dual function of a positive lock and an interlock for shift rods which is extremely simple in construction and wherein the locking elements and rods have a sufficient area of contact to give satisfactory life in service.

A further object of the present invention is to provide an improved interlock and positive locking mechanism wherein the locking elements have at least a line contact with the shift rods when operating to prevent axial movement of the latter and wherein the shift rods are not excessively weakened by the extent of reduction of their cross section to provide cooperating structure for the interlock and positive lock.

Further, it is an object of this invention to provide an interlock and positive locking mechanism for a plurality of individually shiftable shift rods which employs interchangeable locking elements.

These and other objects and advantages of the invention will be evident from the following description when read in conjunction with the accompanying drawings in which:

FIG. 1 is a sectional view of a power transmitting mechanism in which the present invention is incorporated;

FIG. 2 is an enlarged section view taken along line II—II of FIG. 1;

FIG. 3 is an enlarged sectional view of the interlock and positive lock mechanism of this invention showing the lower or first shift rod shifted into a predetermined drive establishing position;

FIG. 4 is an end view of a locking element;

FIG. 5 is a sectional view taken along the line V—V in FIG. 4.

Referring to FIG. 1, a clash type change speed transmission assembly 7 of the type having a neutral and six power transmitting positions of adjustment, includes a support housing 10 in which are rotatably mounted an input shaft 8, an output shaft 91 and reverse and change speed gearing 9. The transmission assembly 7 is associated with a power source such as an internal combustion engine generally indicated by the reference character 11. Clutch means in the form of a friction clutch assembly 12 is located within a housing 13 and serves to selectively couple a pair of coaxial rotary power transmitting members, namely, input shaft 8, which drives the gearing 9 and the flywheel 17 of engine 11. Both support housing 10 and clutch housing 13 are fixedly secured to a main frame 15.

In the positive lock and interlock mechanism 16 of this invention a first shift rod 18, a second shift rod 19 and a third shift rod 21 are reciprocably mounted, respectively, in longitudinal bores 22, 23 and 24 which are provided in the support housing 10. The rods 18, 19 and 21 are coplanar and in spaced parallel relations to each other and they are individually shiftable longitudinally in opposite directions from a neutral position, in which shown in FIGS. 1 and 2, into predetermined shifted or gear engaging positions in which power is transmitted through the transmission.

Referring also to FIGS. 2 and 3, the first shift rod 18 is provided with three axially spaced recess portions 31, 32, 33, rod 19 is provided with three axially spaced recess portions 36, 37, 38 in confronting relation to the recesses on rod 18, and rod 21 is provided with three axially spaced recess portions 39, 41, 42. In confronting relation to rod 19, the recess portions may also be referred to as recesses. Four interchangeable locking elements 51, 52, 53, 54 are mounted in a suitably formed cavity 56 in housing 10 for reciprocable movement along a line 57 coplanar with and at right angles to the shift rods 18, 19, 21.

As shown in FIGS. 4 and 5 the locking elements each have a cylindrical abutment surface 61 which is appropriately proportioned to fit into one of the recesses 31, 32, 33, 36, 37, 38, 39, 41, 42 defined by cylindrical surfaces whose axes are at right angles to the plane defined by the axes of three shift rods, 18, 19, 21. Each of the elements has a pair of legs 62, 63 which are spaced from one another a sufficient transverse distance to permit a shift rod to reciprocate freely therebetween.

Referring to FIGS. 1 and 2 when the clutch means or clutch 12 are engaged the clutch control linkage 66, which includes manual control lever 67, will be in the position shown in FIG. 1. In this condition of adjustment a locking member 71 will be automatically inserted between locking elements 53, 54 by virtue of its connection to the clutch control linkage 66 through link 72. Link 72 is pivotally interconnected between clutch throwout yoke 73 and member 71. When the tapered end of the locking member 71 is inserted into the opening defined by shallow grooves 76, 77 of elments 54, 53, the member 71 will force the elments 53 and 54 apart thereby moving the abutment portions 61, 78 thereof into neutral recesses 31 and 37, respectively. Upon upward movement of element 53, abutment means in the form of legs 81, 82 on element 53 and legs 83, 84 on element 52 cause elements 52 and 51 to move upwardly placing the latter's abutment surface 86 into at least a line contact engagement with neutral recess 41. Thus it is apparent that when the clutch 12 is moved to its engaged position the locking member 71 automatically causes the shift rods 18, 19, 21 to be positively locked against axial movement.

As seen in FIG. 1, when the shift rods are in their neutral position the recesses 32, 37, 41 are in alignment with line 57 and in alignment with the locking elements.

It is obvious that when one of the other recesses of a rod come into alignment with line 57, such shift rod will be in a shifted position in which power will be transmitted to the transmission output shaft 91. The transmission is shifted by a conventional manual control lever 92 which includes a depending finger 93 which extends selectively into one of the grooves or pockets 94 in the ends of the shift rods.

The U-shaped elements, in addition to serving to lock the shift rods against movement, upon actuation by locking member 71, also serve as an interlock. If any one of the shift rods is moved axially to a position intermediate its neutral and shifted positions the other two rods will be locked in place by action of the abutment surfaces of the elements registering with the neutral recesses of the other two rods. This interlocking action occurs as gears are being shifted, that is, during movement of the shift rod between neutral and adjusted positions. If for instance rod 19 is shifted from its neutral position locking element 52 is cammed upwardly by action of abutment surface 79 on a recess 104 in the upper side of rod 19 thus moving the abutment surface 86 into recess 41 of rod 21. Thus when shift rod 19 is moved to either of its adjusted positions, rod 21 will be positively maintained in its neutral position by action of detents 52, 51 until rod 19 is again returned to its neutral position.

From the foregoing it is apparent that my novel positive lock and interlock for shift rods gives at least a line contact between the abutment surfaces 61, 78, 79, 86 and the mating recesses 31, 32, 33, 36, 37, 38, 39, 41, 42, thus providing sufficient contact area to insure long life and elimination of the possibility of malfunctions of the lock and interlock mechanism. Interchangeability of the locking elements greatly reduces manufacturing cost.

Although a single embodiment of this invention has been illustrated and described, it is not intended to limit the invention except as necessitated by the scope of the appended claims.

What is claimed is:

1. An automatic lock for first, second, and third parallel and coplanar shift rods of a change speed gear type transmission, the power to which passes through a clutch, said automatic lock comprising:

first and second abuttable locking elements mounted on said housing between and in confronting relation to said first and second shift rods, respectively, for reciprocable movement along a line coplanar with and at right angles to said shift rods, recesses formed on said first and second shift rods for registration with said first and second locking elements, respectively, in the neutral and shifted positions of said first and second shift rods, said second locking element being U-shaped with legs extending partially around said second shift rod on opposite sides thereof, a third locking element mounted on said housing between said second and third rods in aligned relation with said first and second locking elements for reciprocable movement along said line, said third locking element being U-shaped with legs extending partially around said second shift rod on opposite sides thereof in abuttable relation, respectively, to said legs on said second locking element, recesses formed on said third shift rod on the side thereof facing said second shift rod for alignment with said third locking element in the neutral and shifted positions of said third shift rod, means operatively associated with said third locking element for locking said third shift rod against axial movement when said third locking element is shifted along said line toward said third shift rod and the latter is in one of its neutral and shifted positions, a locking member shiftably mounted on said housing for insertion between said first and second locking elements to separate them in the direction of said line, and linkage means operatively associated with said clutch and locking member whereby said member is automatically inserted between said first and second elements to thereby lock said shift rods against axial movement when said clutch is engaged.

2. A combined positive lock and interlock for first, second, and third parallel and coplanar shift rods of a change speed gear type transmission, the power to which passes through a clutch, said combined lock and interlock comprising:

first and second abuttable locking elements mounted on said housing between and in confronting relation to said first and second shift rod, respectively, for reciprocable movement along a line coplanar with and at right angles to said shift rods, recesses formed on said first and second shift rods for registration with said first and second locking elements, respectively, in the neutral and shifted positions of said first and second shift rods, said second locking element being U-shaped with legs extending partially around said second shift rod on opposite sides thereof, a third locking element mounted on said housing between said second and third rods in aligned relation with said first and second locking elements for reciprocable movement along said line, a recess on said second shift rod in registration with said third locking element in the neutral position of said second shift rod, said third locking element being U-shaped with legs extending partially around said second shift rod on opposite sides thereof in abuttable relation, respectively, to said legs on said second locking element, recesses formed on said third shift rod and in alignment with said line in the neutral and shifted positions of said third shift rod, abutment means operatively associated with said third locking element for locking said third shift rod against axial movement when said third locking element is shifted along said line toward said third shift rod and the latter is in one of its neutral and shifted positions, a locking member shiftably mounted on said housing for insertion between said first and second locking elements to separate them in the direction of said line, and linkage means operatively associated with said clutch and locking member whereby said member is automatically inserted between said first and second elements to thereby lock said shift rods against axial movement when said clutch is engaged, said third locking element and abutment means locking said third rod against axial movement when said second rod is moved from its neutral position to its shifted positions.

3. The structure set forth in claim 2 wherein said abutment means is a fourth locking element in abutting relation to said third locking element.

4. The structure set forth in claim 3 in which said elements are interchangeable.

References Cited in the file of this patent

UNITED STATES PATENTS

| | | |
|---|---|---|
| 1,537,584 | Carhart | May 12, 1925 |
| 2,847,871 | Shick | Aug. 19, 1958 |
| 2,953,035 | Herr | Sept. 20, 1960 |